United States Patent [19]

van Landegem

[11] Patent Number: 5,265,091
[45] Date of Patent: Nov. 23, 1993

[54] ADAPTATION OF RESERVED ESTIMATED BANDWIDTH FOR PERMANENT VIRTUAL CONNECTION

[75] Inventor: Thierry L. M. F. van Landegem, Turnhout, Belgium

[73] Assignee: Alcatel N.V., Netherlands

[21] Appl. No.: 835,294

[22] Filed: Feb. 13, 1992

[30] Foreign Application Priority Data

Feb. 13, 1991 [EP] European Pat. Off. ........ 91200301.9

[51] Int. Cl.⁵ .......................... H04J 3/26; H04L 12/56
[52] U.S. Cl. ...................... 370/60; 370/94.1; 370/94.3; 370/80
[58] Field of Search .............. 370/94.1, 60, 79, 85.7, 370/118, 60.1, 58.1, 58.2, 80, 94.3, 95.1

[56] References Cited

U.S. PATENT DOCUMENTS

| | | | |
|---|---|---|---|
| 4,984,264 | 1/1991 | Katsube | 370/54 |
| 5,130,982 | 7/1992 | Ash et al. | 370/79 |
| 5,132,966 | 7/1992 | Hayano et al. | 370/85.6 |
| 5,164,938 | 11/1992 | Jurkevich et al. | 370/94.1 |

Primary Examiner—Douglas W. Olms
Assistant Examiner—Min Jung
Attorney, Agent, or Firm—Ware, Fressola, Van Der Sluys & Adolphson

[57] ABSTRACT

This system (ATMS) comprises a plurality of interconnected nodes (NN1/NN4) to which server units (CLSD1/CLS3) and users (CLTE1/CLTE5, MAN1/2) are connected. Permanent virtual connections established between the server units constitute a virtual overlay network over which the users can communicate with each other in a connectionless way. The bandwidth reserved for communications on the permanent virtual connection is adapted dynamically according to the result of a comparison between the reserved bandwidth, as stored by counter means (CO1/CO4), and the used bandwidth, as measured by measurement modules (MC1/MC3).

8 Claims, 13 Drawing Sheets

DATA TABLE (NI)

| NN1 | CLS1 | CLTE5 | CLTE4 | NMC | NN3 | NN4 | NN2 | 0 |
|---|---|---|---|---|---|---|---|---|
| NN2 | CLS2 | MAN2 | CLTE2 | NN3 | NMC | NN1 | NN4 | 0 |
| NN3 | CLS3 | CLTE3 | NMC | NN1 | NN4 | NN2 | 0 | |
| CLS1-CLS31 | VPI4 | B1 | CLS1 | VPI1 | LNN1 | BS1 | | |
| CLS1-CLS32 | VPI5 | B1 | CLS2 | VPI2 | LNN2 | BS2 | | |
| CLS1-CLS33 | VPI6 | B2 | CLS3 | VPI3 | LNN3 | BS3 | | |
| CLS1-CLS2 | VPI7 | B3 | CLS1 | CLTE5 | BU1 | P | | |
| CLS2-CLS1 | VPI8 | B4 | CLS1 | CLTE1 | BU2 | P | | |
| CLS2-CLS3 | VPI9 | B5 | CLS2 | MAN1 | BU3 | P | | |
| CLS3-CLS1 | VPI10 | B6 | CLS2 | MAN2 | BU4 | P | | |
| CLS3-CLS2 | VPI11 | B7 | CLS3 | CLTE3 | BU5 | NP | | |

DATA TABLE (CIN)  DATA TABLE (CUS)  DATA TABLE (CRO)

FIG. 6

| | | | TABLE (CIC1) | | TABLE (CIC2) | | |
|---|---|---|---|---|---|---|---|
| CLS1-CLS31 | VPI4 | B1 | CLTE5 | BU1 | P | VPIU1 |
| CLS1-CLS32 | VPI5 | B1 | CLTE1 | BU2 | P | VPIU2 |
| CLS1-CLS33 | VPI6 | B2 | VPI4 | τ1 | x1 | TABLE (CCI) |
| CLS1-CLS2 | VPI7 | B3 | VPI5 | τ2 | x2 | |
| VPI4 | B11 | | VPI7 | τ2 | x2 | |
| VPI5 | B21 | | | | | |
| VPI7 | B31 | TABLE (BMI) | | | | |

FIG.8

(a) 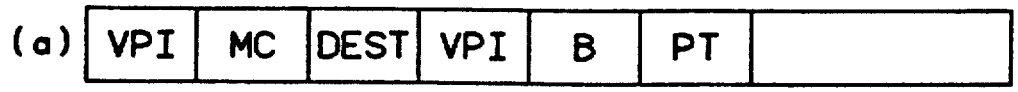
(b) 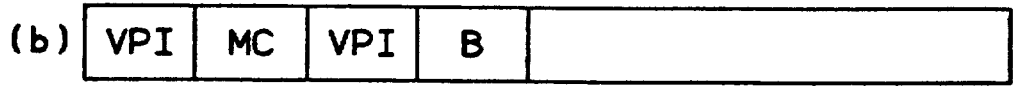
(c) 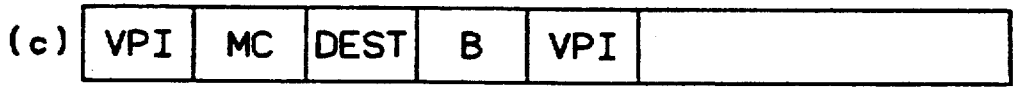
(d) 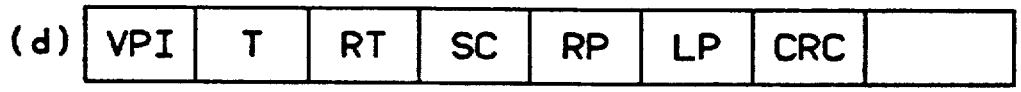
(e) 
(f) 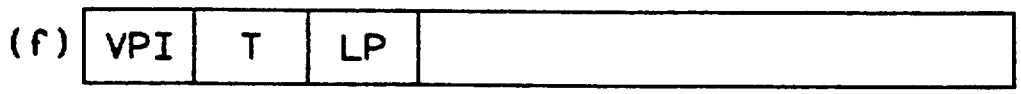
(g) 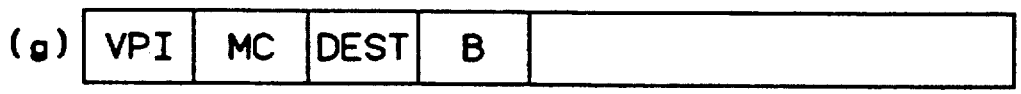
FIG. 10

5,265,091

ADAPTATION OF RESERVED ESTIMATED BANDWIDTH FOR PERMANENT VIRTUAL CONNECTION

TECHNICAL FIELD

The present invention relates to a communication switching system with a plurality of terminal units, coupled via switched communication links, and control means to establish between at least a pair of said terminal units and over said links at least one permanent virtual connection with an estimated bandwidth.

BACKGROUND OF THE INVENTION

Such a communication switching system is already known in the art, e.g. from the article "Architectural Issues in the Interoperability between MANs and the ATM network" by A. Biocca et al., published in the proceedings of the XIII-th International Switching Symposium held in Stockholm from May 27 to Jun. 1, 1990, Session A3, paper #4, volume II page 27.

This known communication switching system includes an Asynchronous Transfer Mode (ATM) switching network whose control modules constitute the control means. An ATM switching network is inherently connection oriented, meaning that before establishing a communication from an origin to a destination a temporary virtual path is established, this path being released at the end of the communication. To be able to establish communications over this network in a connectionless way, i.e. without a virtual path having to be established first, as for instance when transmitting datagrams or broadcast messages and in case of interconnected Local and Metropolitan Area Networks, the known switching system includes a virtual overlay network formed by a plurality of permanently allocated virtual paths with an assigned estimated bandwidth. Communication over these permanent virtual paths which are not released at the end of this communication is done under control of terminal units called connectionless servers which are also part of the virtual overlay network.

A main drawback of this known switching system is that in order to cope with possible traffic variations proper to connectionless traffic, the estimated bandwidth assigned to each of the permanent virtual paths has to be at least equal to the expected peak traffic thereon. This leads to a waste of bandwidth when the real traffic is smaller than the estimated one or to unsatisfactory operation when the real traffic is higher than the estimated one.

SUMMARY OF THE INVENTION

An object of the present invention is to provide a switching system of the above type but which does not present this drawback.

This object is achieved by a system that further includes a counter to register said reserved estimated bandwidth;
measurement circuits to measure the bandwidth used on said permanent virtual connection; and a
second control circuit which cooperates with said first mentioned control means to compare said estimated and used bandwidths and which according to the result of this comparison adapts the bandwidth reserved for communication between said terminal units.

In this way the bandwidth used on each permanent virtual connection is continuously checked and the bandwidth reserved thereon is continuously adapted to this use.

It has to be noted that counter means and measurement means as mentioned above are already known in the art, e.g. from the published international application PCT/EP88/0482 and the published French patent application 89.08191 respectively, where they are however used in a connection-oriented environment. Indeed, the results of these counter means are used to decide whether new temporary virtual paths may be established and the function of the known measurement means is to decide about dropping of cells when the bandwidth reserved for a temporary allocated virtual path is exceeded. According to the present invention however, these means are involved in the management of bandwidth resources in a connectionless environment, i.e. based on figures provided by said means the bandwidth reserved for permanent virtual paths is adapted dynamically when needed.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 6 represents tables NI, CIN, CRO and CUS of information memory IMN of FIG. 5 in more detail;

FIG. 8 represents tables CIC1, CIC2, CCI, BMI of information memory IMC of FIG. 7 in more detail;

FIG. 10 (a/f) shows the structure of cells used in the system of FIG. 1;

BEST MODE FOR CARRYING OUT THE INVENTION

Figure 1:
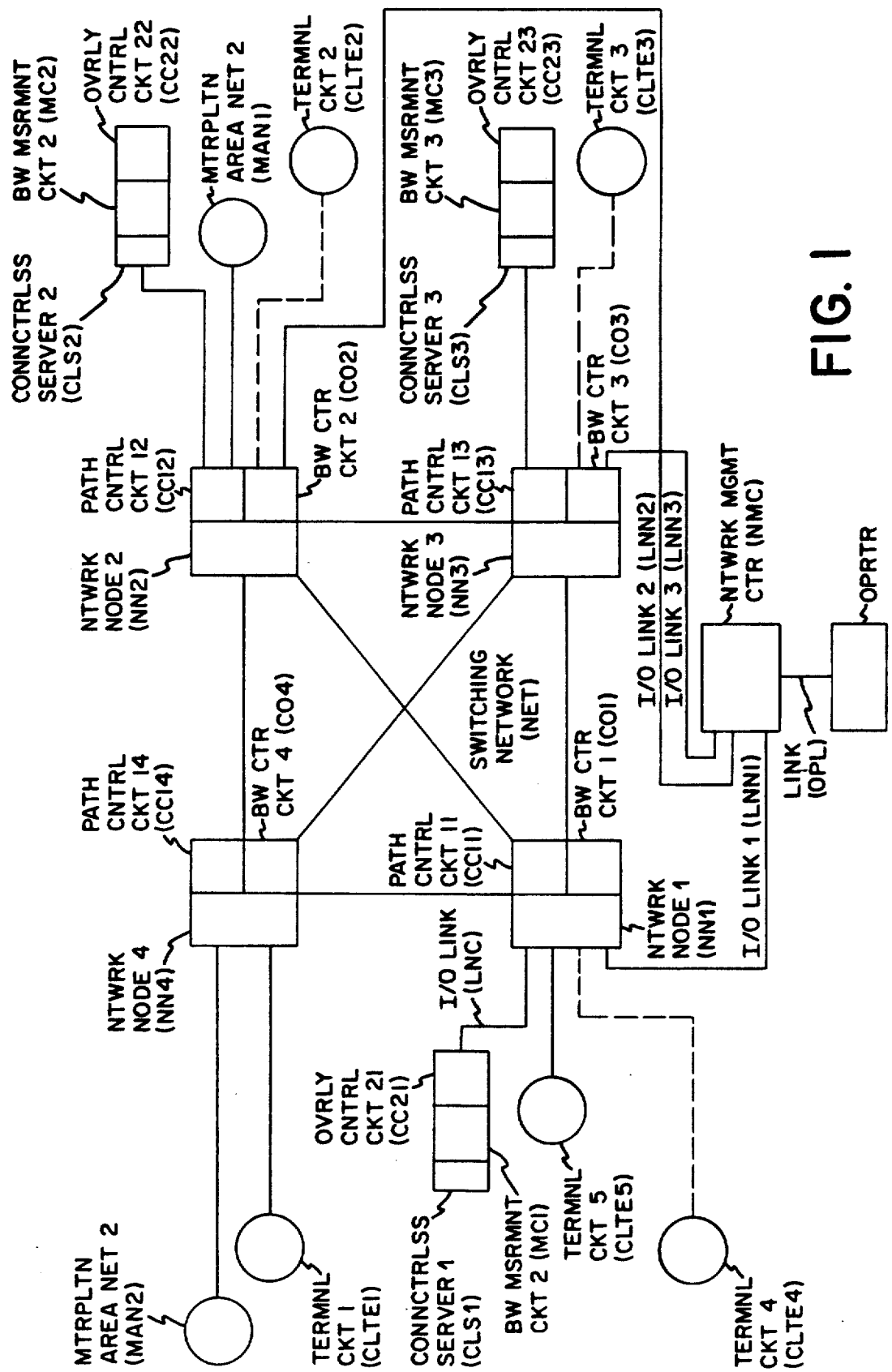
FIG. 1 is a schematic diagram of a telecommunication switching system ATMS according to the invention.

Referring to FIG. 1 the telecommunication switching system ATMS shown therein is able to establish communications between nodes via virtual paths, permanently or temporarily allocated to these communications, on links between the nodes, each communication involving the transmission of cells of information. The system includes the following functional blocks:
a switching network NET with a plurality of network nodes NN1 to NN4 interconnected by a plurality of communication links on which temporary and permanent virtual paths can be allocated to communications, the permanent paths constituting a so called virtual overlay network with respect to the switching network. Each network node is constituted by a digital switching network which is for instance of the type described in the published PCT application No. PCT/EP88/00482;

path control circuits CC11 to CC14 which are part of NN1 to NN4 respectively and which for each communication on a link of the switching network NET control the allocation of a virtual path in function of the total bandwidth available on this link and the bandwidth to be reserved for that communication or path. They also control path release;

bandwidth counter circuits CO1 to CO4, included in NN1 to NN4 respectively, to keep track of the total bandwidth reserved for the communications over all virtual paths permanently and temporarily allocated on each link as well as of the maximum allowable bandwidth thereon;

bandwidth measurement circuits MC1 to MC3 which are part of respective ones of 3 so called connectionless servers CLS1, CLS2, CLS3 which are connected to NN1, NN2 and NN3 respectively and are adapted to measure the mean bandwidth used for communications over permanently allocated virtual paths, overlay control circuits CC21 to CC23 also included in respective ones of the connectionless servers CLS1 to CLS3 and which interwork with the path control circuits CC11 to CC14, to setup/release permanent virtual paths, as well as with the bandwidth counter circuits CO1 to CO4 and with the bandwidth measurement circuits MC1 to MC3 to decide about adaptation of the estimated bandwidth reserved for the permanent virtual paths;

a network management centre NMC to which an operator OP has access via a link OPL and which has itself access to the connectionless servers CLS1 to CLS3 via the switching network nodes NN1 to NN3. NMC interworks with the overlay control circuits CC21 to CC23 for initial setup of permanent virtual paths, constituting the virtual overlay network, and for setup/release of additional/existing permanent virtual paths; and a plurality of users of the switching system connected to it in the following way:
terminal circuits CLTE4 and CLTE5 connected to NN1;
a first metropolitan area network MAN1 and a terminal circuit CLTE2 connected to NN2;
a terminal circuit CLTE3 connected to NN3 and
a second metropolitan area network MAN2 and a terminal circuit CLTE1 connected to NN4.

All communication to and from users has to happen via a predetermined dedicated connectionless server, i.e. communication to/from CLTE1 and CLTE5, MAN1 and MAN2, CLTE3 has to go via CLS1, CLS2 and CLS3 respectively. To be noted that the users CLTE2 and CLTE4 are able to communicate with each other directly via the switching network in a connection-oriented way, i.e. via temporarily established virtual paths indicated by dotted lines in FIG. 1, and are therefore no users of the virtual overlay network.

Figure 2:
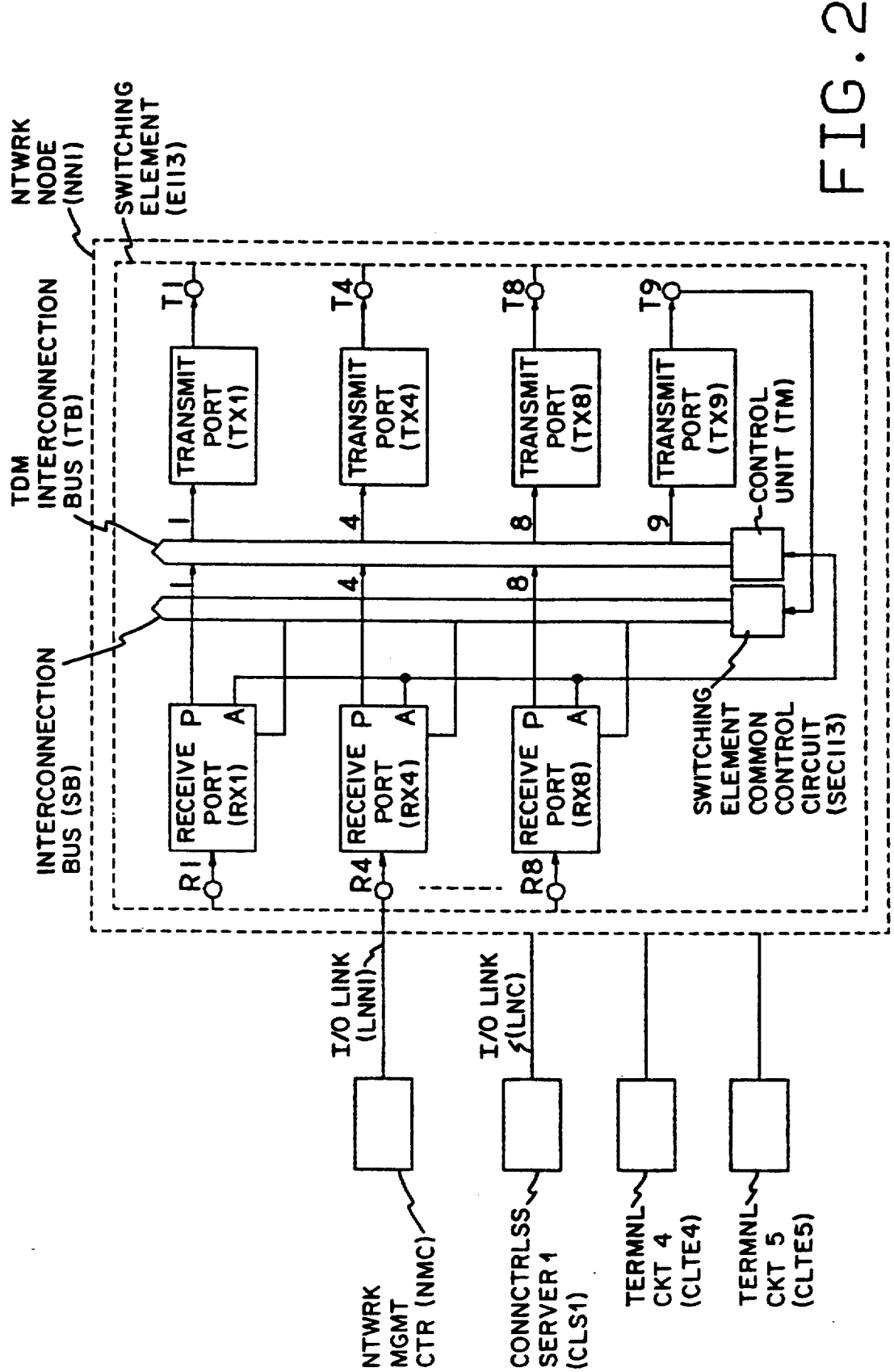
FIG. 2 is a schematic representation of the network node NN1 of FIG. 1.
Figure 3:
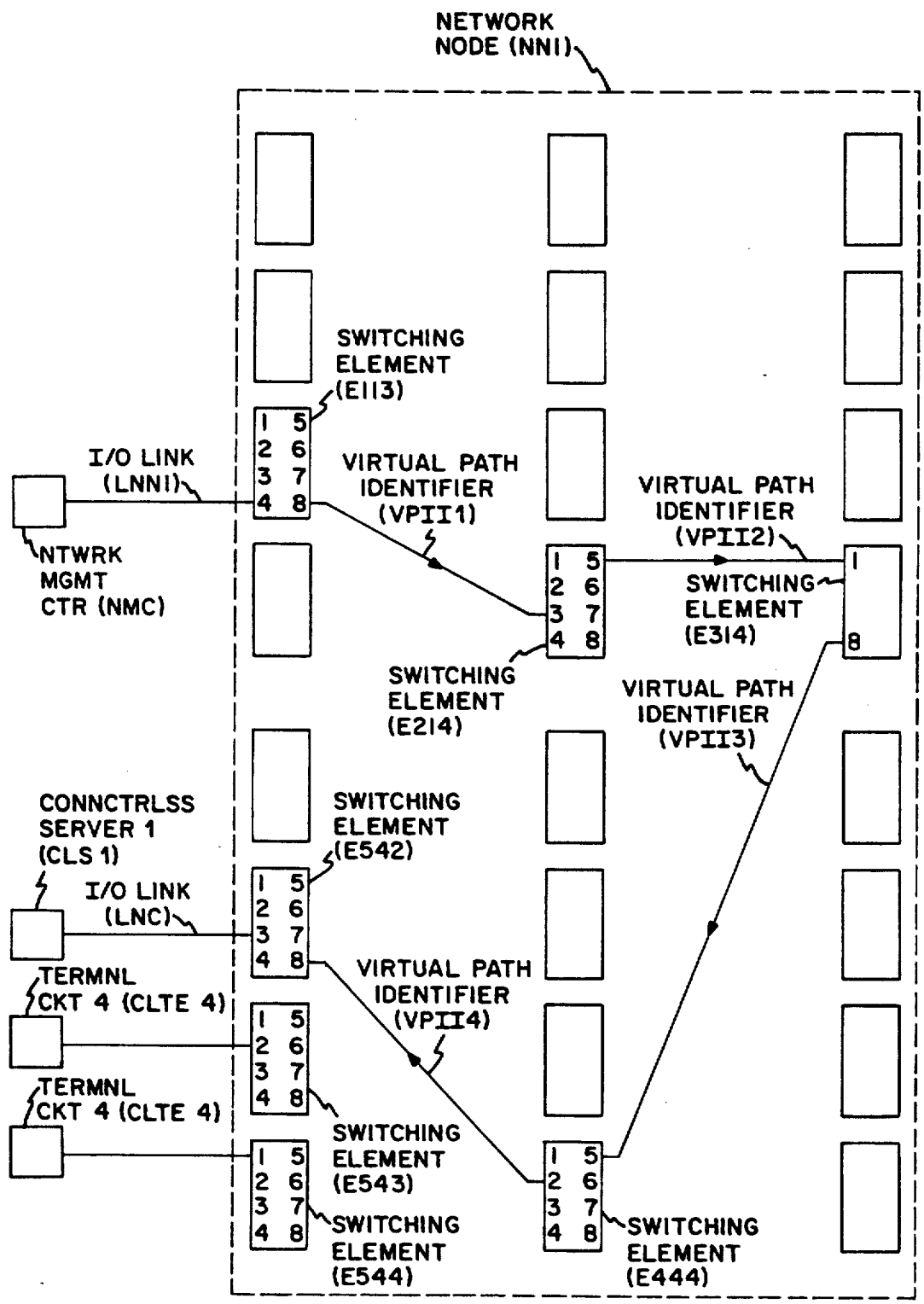
FIG. 3 represents a more detailed embodiment of the node NN1 shown in FIG. 2.
Figure 4:
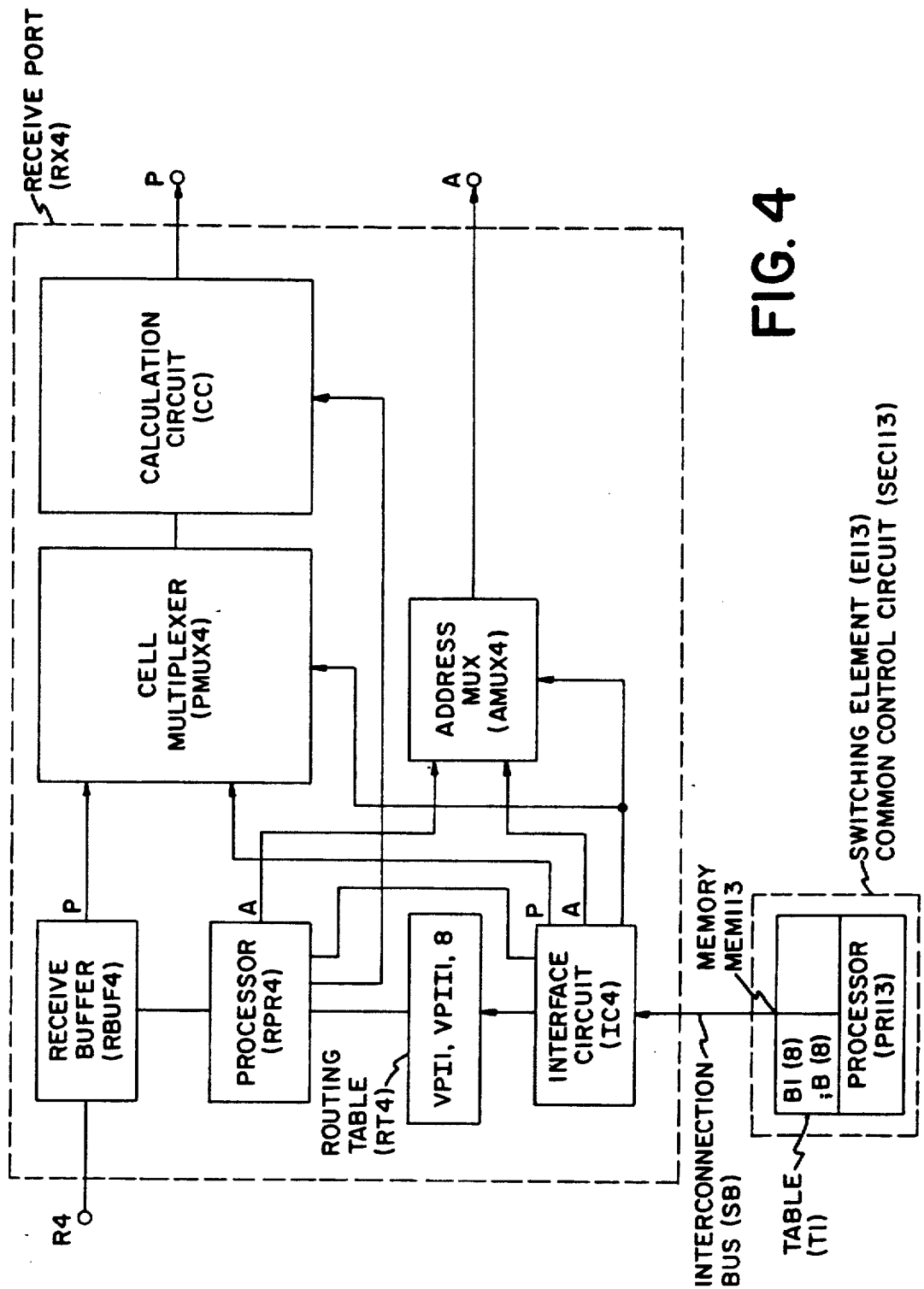
FIG. 4 shows in more detail the receive port RX4 and the control circuit SEC311 of switching element E113 of FIG. 3.
Figure 5:
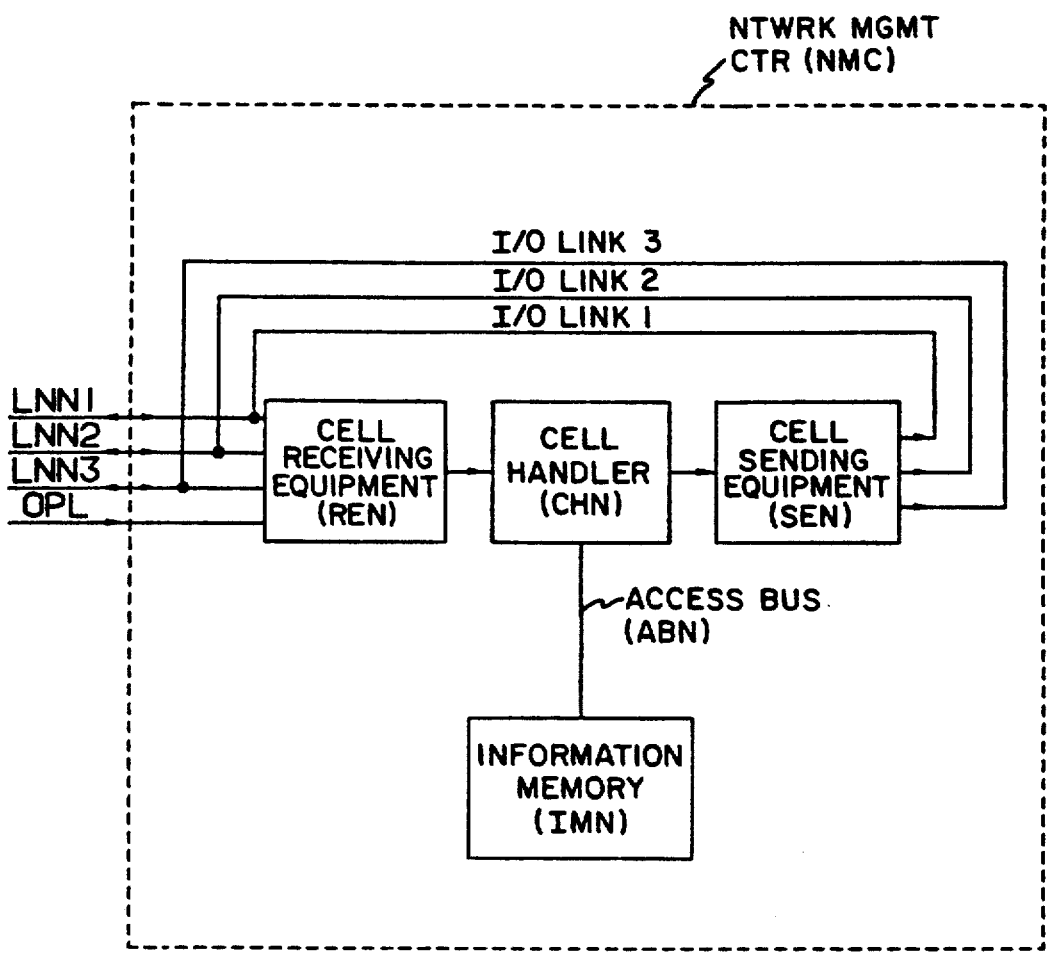
FIG. 5 is a schematic representation of the network management circuit NMC of FIG. 1.
Figure 7:
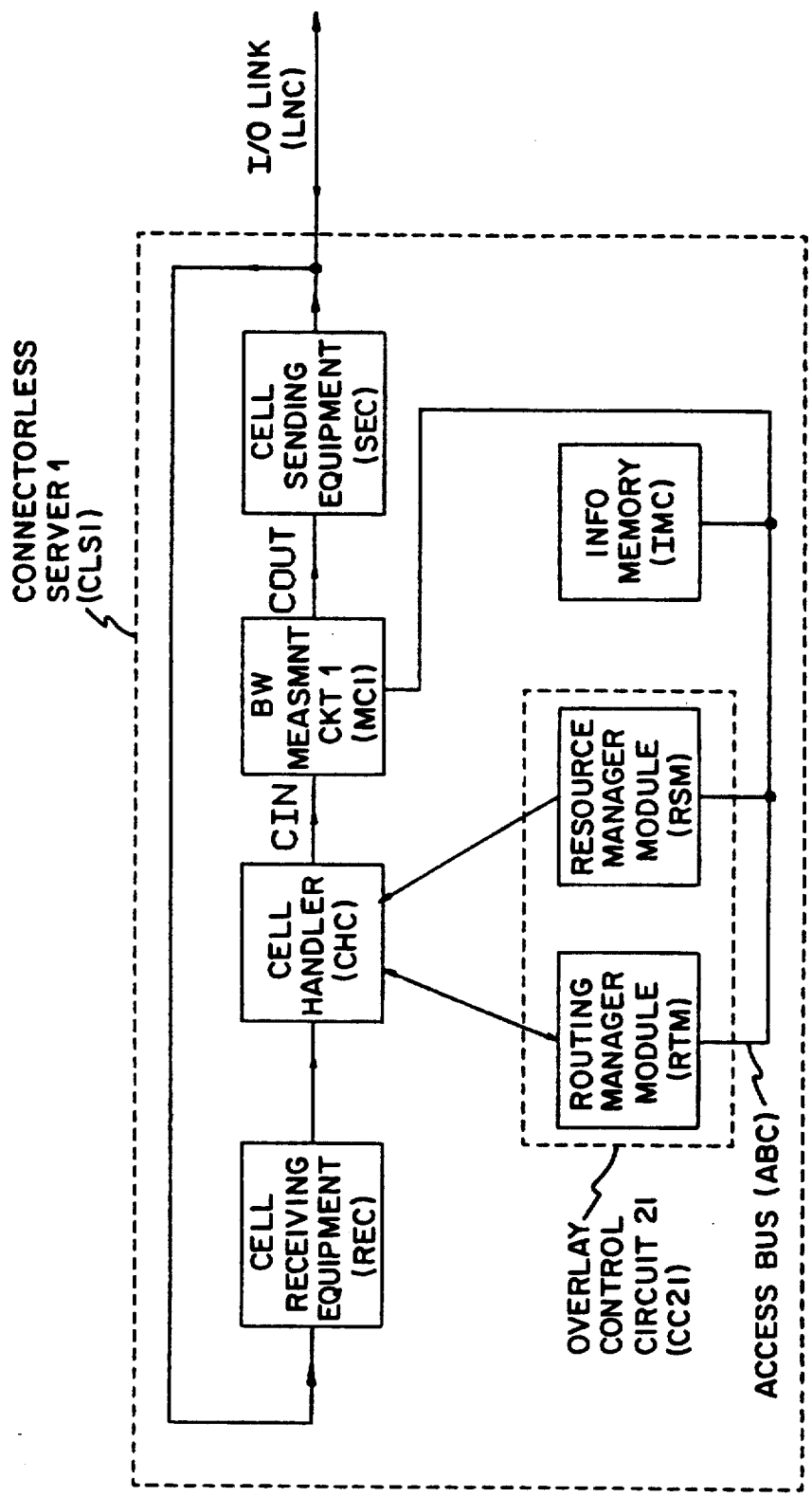
FIG. 7 is a schematic diagram of the connectionless server CLS1 of FIG. 1.
Figure 9:
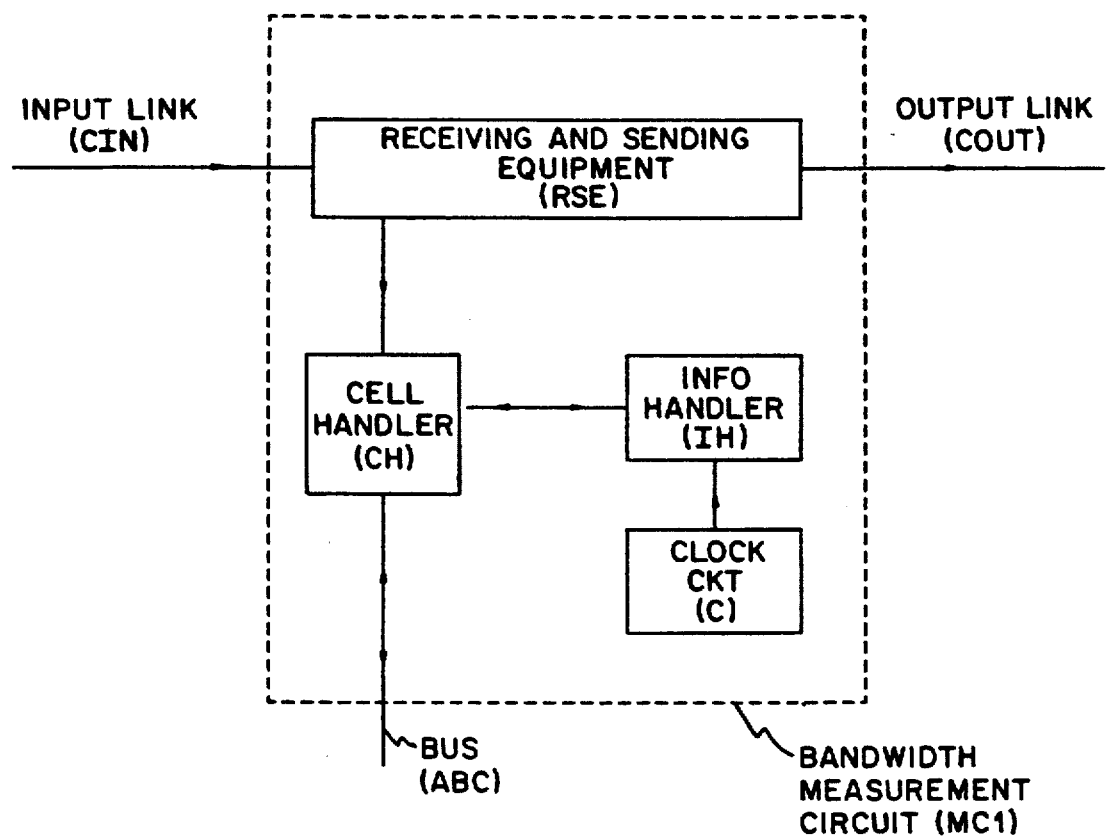
FIG. 9 is a schematic representation of the bandwidth measurement circuit MC1 of FIG. 7.

Reference is now made to the following figures for a more detailed description of elements included in the telecommunication switching system ATMS of FIG. 1:
FIGS. 2 to 4 for network node NN1;

FIGS. 5 and 7 for the network management circuit NMC and the connectionless server CLS1 respectively; and
FIG. 9 for the bandwidth measurement circuit MC1 which is part of the connectionless server CLS1.

It has to be noted that all network nodes and connectionless servers of the switching system ATMS are similar to the described node NN1 and connectionless server CLS1 respectively.

Network Node NN1

FIGS. 2, 3, 4

Node NN1 represented in FIG. 2 is of the type described in the published PCT application mentioned earlier. It is a multi-stage cell switching network to which a plurality of users NMC, CLS1, CLTE4 and CLTE5 are coupled via Asynchronous Transfer Mode (ATM) transmission links. These users are able to be connected to each other via a number of cascaded stages of switching elements of which only one, E113 is shown in relative detail. This switching element has 8 input terminals R1/R8 connected to respective output terminals of a preceding stage or to user equipment as for E113 and 8 output terminals T1/T8 connected to respective input terminals of a following stage. Inside the switching element E113 the input terminals R1/R8 are connected to respective input or receive ports RX1/RX8 which have a cell output P and an address output A and which are further connected through an interconnection bus SB to a switching element common control circuit SEC113. The cell outputs P are connected to the inputs 1/8 of a Time Division Multiplex (TDM) interconnection bus TB which is controlled by a control unit TM to which the address outputs A of the receive ports RX1/RX8 are connected. Eight outputs 1/8 of the bus TB are connected through respective output or transmit ports TX1/TX8 to respective output terminals T1/T8 and a ninth output 9 is connected to the control circuit SEC via a transmit port TX9 having terminal T9.

A detailed embodiment of the switching network NN1 is represented in FIG. 3 and is also of the type disclosed in the above mentioned published PCT application. It includes three stages of switching elements whose terminals 1/8 each represent both a receive terminal R1/R8 and a transmit terminal T1/T8 of FIG. 2. The network is a folded one, with both the input and output terminals on one (left) side and a mirror plane at the other (right) side. Between a terminal used as input and the mirror plane, NN1 is a distribution network where the path selection may be performed freely, whereas between the mirror plane and a terminal used as output it is a routing network wherein the path is predefined. A path selected in the distribution network may be extended in the routing network to any of the outputs NMC, CLS1, CLTE4 and CLTE5 connected to NN1 via the switching elements E113, E542, E543 and E544 respectively.

FIG. 4 shows for the switching element E113 in FIG. 2, the essential parts of its receive port RX4 and of its control circuit SEC113. The receive port RX4 includes a receive buffer RBUF4, a processor RPR4, a routing table RT4, an interface circuit IC4, a cell multiplexer PMUX4, an address multiplexer AMUX4 and a calculation circuit CC. The above mentioned bus SB is connected to the interface circuit IC4 which has access to the processor RPR4 and to routing table RT4 and the latter table is coupled to the processor RPR4 which has access to the buffer RBUF4 and to the calculation circuit CC. The buffer RBUF4 has a cell input R4 and a cell output P which is connected to an input of the cell multiplexer PMUX4 whose output is connected to the calculation circuit CC. A cell output P of the interface circuit IC4 is connected to another input PMUX4. The processor RPR4 and the interface IC4 further have address outputs A which are connected to respective inputs of the address multiplexer AMUX4. The multiplexers PMUX4 and AMUX4 are controlled by the interface circuit IC4. The outputs P of the calculation circuit CC and A of the multiplexer AMUX4 constitute the outputs of the receive port RX4.

The switch element control circuit SEC113 includes a processor PR113 and an associated memory MEM113 which includes amongst others table T1 storing for each path of each link of the switch the total allocated bandwidth as well as the total allowable bandwidth on said link, e.g. B1(8) and B(8) respectively. The bandwidth values contained in T1 are kept up to date by PR113. T1 and PR113 therefore form part of the counter circuit CO1 of FIG. 1. Hence, CO1 is distributed over all input terminals of NN1. RPR4 and PR113 control, as will be explained later, the setup and release of virtual paths on the links connected to port 4 of NN1 and thus form part of the control circuit CC11 shown in FIG. 1. Hence, CC11 is distributed over all input terminals of NN1.

Network Management Circuit NMC

FIGS. 5 and 6

The network management circuit NMC represented in FIG. 5 comprises a cell receiving equipment REN, a cell handler CHN and a cell sending equipment SEN which are all coupled in series between its input/output links LNN1 to LNN3 from/to the switching system, the cell handler CHN having access to an information memory IMN through an access bus ABN. REN further has an operator link OPL connected to an operator circuit OP (FIG. 1). As shown in FIG. 6 this memory comprises data tables NI, CIN, CRO and CUS. Table NI stores information concerning the managed network and tables CIN, CRO, CUS store data relating to the connectionless servers.

The receiving and sending equipment REN and SEN are commonly used circuits to respectively receive/send cells from/over communication links to which they are connected. Therefore they will not be considered in detail.

The cell handler CHN is a processor which analyses a cell received by REN and takes appropriate actions according to the type and contents of this cell thereby using the information memory IMN when needed. Its operation will be explained and the contents of this information memory IMN will be considered in detail later when describing the working of the switching system.

Connectionless Server CLS1

FIGS. 7 and 8

The connectionless server CLS1 shown in FIG. 7 includes a cell receiving equipment REC, a cell handler CHC, the earlier mentioned bandwidth measurement circuit MC1 and cell sending equipment SEC, all connected in cascade between its input/output link LNC from/to the switching system. The cell handler CHC is further connected to a routing manager module RTM as well as to a resource manager module RSM which via an access bus ABC is linked to an information memory IMC together with RTM. As shown in FIG. 8 this memory comprises among others data tables CIC1, CIC2, CCI and BMI. Tables CIC1 and CIC2 store information concerning the possible path connections over which cells may be sent by CLS1 and table BMI stores values indicative of the bandwidth used on the connections over which cells are transmitted. Finally, table CCI of the information memory IMC is used by the bandwidth measurement circuit MC1 to store intermediate measurement results, as will be explained later when describing the working of this circuit.

Cell receiving equipment REC, cell handler CHC and cell sending equipment SEC are similar to REN, CHN and SEN described in relation to the network management circuit NMC.

The bandwidth measurement circuit MC1 of which a general diagram is shown in FIG. 9. is well known in the art, e.g. from the published French patent application 89.08191. This circuit includes receiving and sending equipment RSE coupled between an input link CIN and an output link COUT as well as to a cell handler CH. The latter has access via the bus ABC to the information memory IMC of the connectionless server (FIG. 7) and is connected to an information handler IH which in its turn is connected to a clock circuit C.

Again referring to FIG. 7 the routing and resource manager modules RTM and RSM shown therein together constitute the overlay control circuit CC21 described earlier in relation to FIG. 1. The routing manager module RTM controls the routing of cells through the virtual overlay network over the permanent virtual paths in a usual and therefore not described way and the resource manager module RSM controls setup/release of such paths and adaptation of the bandwith reserved for communication thereon.

Figure 11:
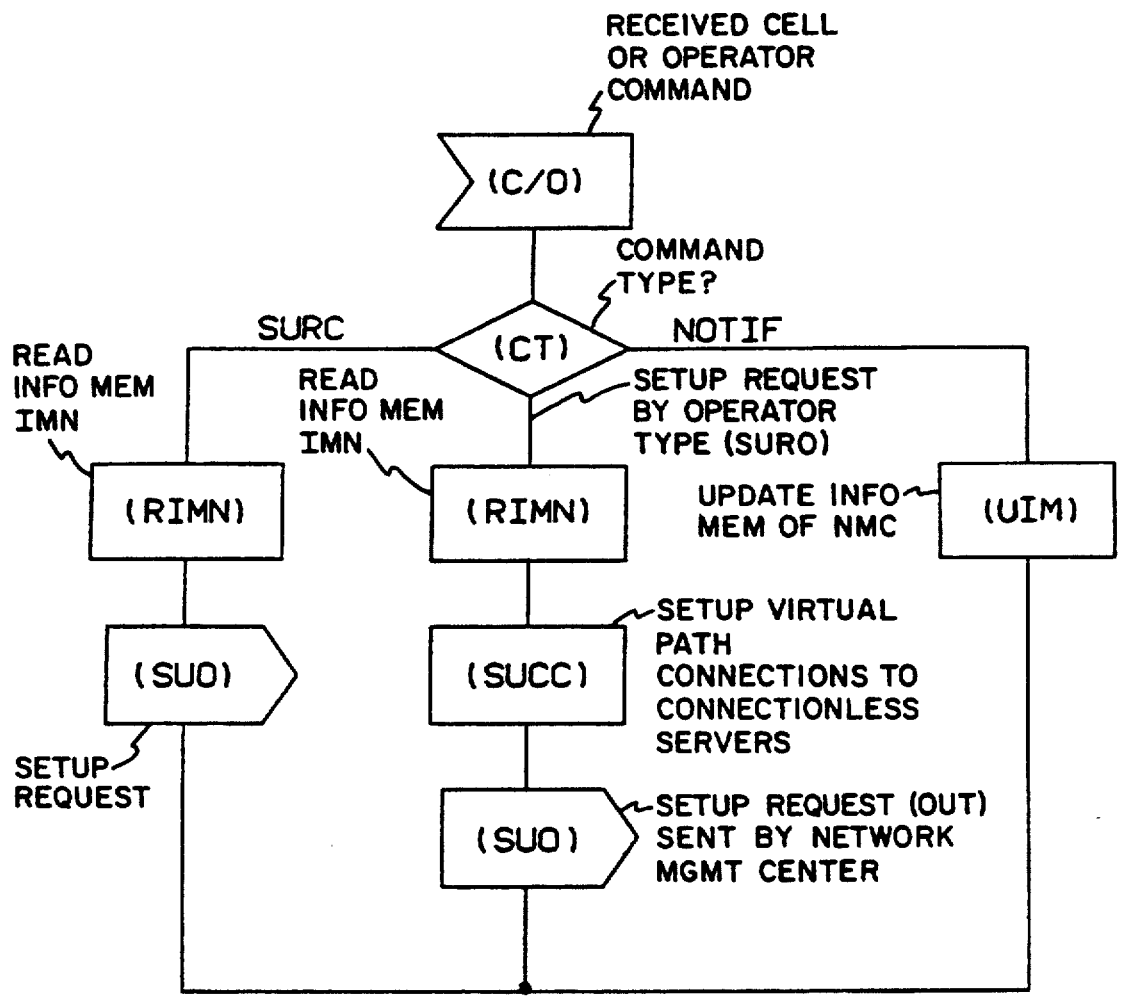
FIG. 11 is a flow diagram of the functions performed by the network management circuit NMC of FIG. 1.
Figure 12:
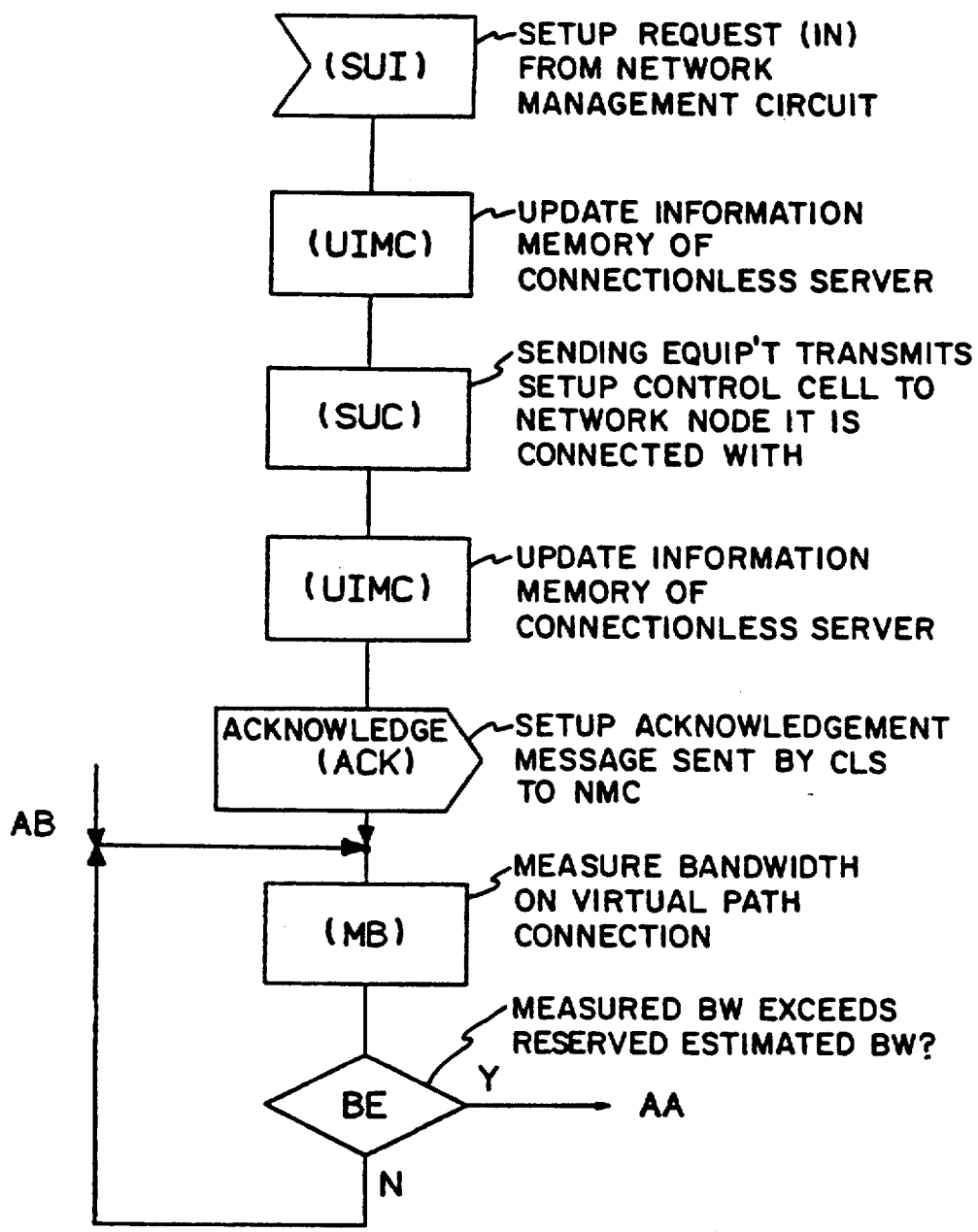
FIGS. 12 and 13 represent flow diagrams of the actions performed by the resource manager module RSM of FIG. 7.
Figure 13:
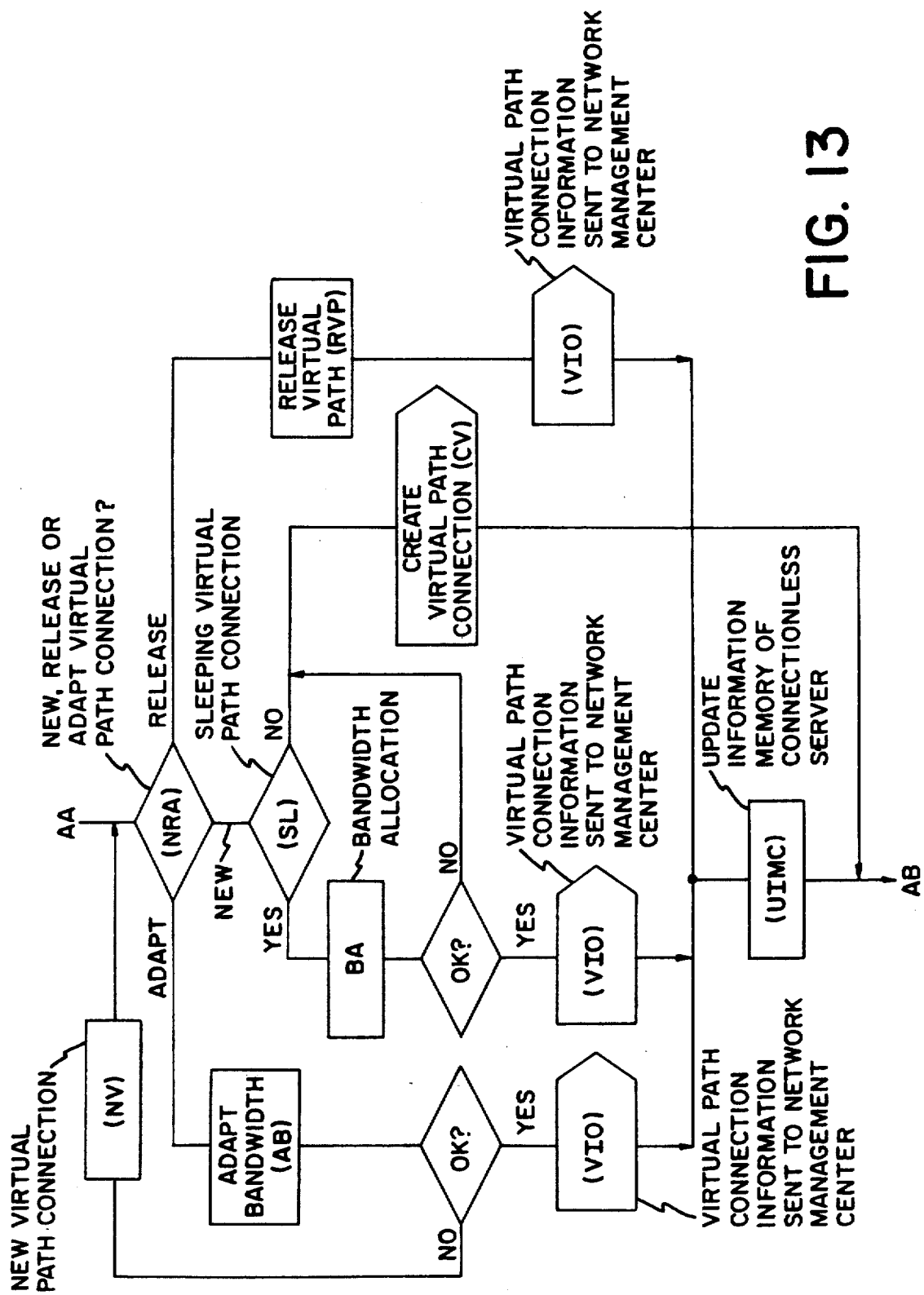

The detailed operation of the modules CC1, CO1, MC1 and RSM will become clear from the following scenario which concentrates on transmission of cells of information through the overlay network:

initial setup of permanent virtual paths forming together a virtual overlay network;

detection of excessive bandwidth use on a permanent virtual path and increase of the bandwidth reserved for this path;

detection and release of redundant permanent virtual paths;

While describing the above mentioned scenario reference is made to FIGS. 11 to 13 which are flow charts of the different steps involved in the handling of an incoming cell by the network management circuit NMC (FIG. 11) and by the resource manager module RSM (FIGS. 12; 13) Following is the list of acronyms used in these flowcharts and their meaning:

| | |
|---|---|
| AB | adapt bandwidth; |
| ACK | acknowledgment message of virtual path connection setup; |
| BA | bandwidth allocation; |
| C/O | received cell or operator command; |
| CSA | connection setup acknowledgment? |
| CV | create virtual path connection; |
| CT | command type? |
| I | information concerning virtual path connections sent out by the network management circuit to the connectionless servers; |
| I/D | increase or decrease? |
| ISU | initial setup? |

| | |
|---|---|
| MB | measure bandwidth on virtual path connection; |
| MC | intermediate cell; |
| MD | measure delay on virtual path connection; |
| N | no; |
| NRA | new, release or adapt virtual path connection? |
| NV | new virtual path connection; |
| RIMN | read information memory IMN; |
| RVP | release virtual path; |
| SL | sleeping virtual path connection? |
| SUCC | setup of virtual path connections to connectionless servers; |
| SUI | setup request from network management circuit; |
| SUO | setup request sent by network management centre; |
| SUR | setup request received by network management centre; |
| BE | bandwidth excess or redundant virtual path connection? |
| UIM | update information memory of NMC; |
| UIMC | update information memory of connectionless server; |
| VII | virtual path connection information received from network management circuit; |
| VIO | virtual path connection information sent to network management centre; |
| Y | yes; |

It has to be noted that the acronyms used for switching system elements and users in the further described tables in fact represent the addresses of these elements and users.

Before creation of the virtual overlay network by the setup of permanent virtual connections which are a concatenation of permanent virtual paths, the following tables are loaded in the information memory IMN (FIGS. 5, 6) of the network management circuit NMC by an operator OP via link OPL and by means of tapes:

the network information table NI (FIG. 6) containing the addresses of all units, i.e. nodes, users and connectionless servers of the system, grouped in such a way as to indicate their interconnections e.g. NN1, CLS1, CLTE5, CLTE4, NMC, NN3, NN4, NN2 indicating that node NN1 is connected to CLS1, CLTE5, CLTE4, NMC, NN3, NN4 and NN2. Each set of interconnected units is terminated by a zero flag;

that part of the connection information table CIN (FIG. 6) containing the addresses of the connectionless servers able to be accessed by each of the connectionless servers CLS1 to CLS3 and the bandwidth to be reserved on permanent virtual path connections to these servers, e.g. CLS1-CLS31, B1 meaning that CLS1 can reach CLS3 via a first permanent virtual path connection determined by its address CLS31 and that the estimated bandwidth to be reserved on this virtual path connection is B1;

the connectionless users table CUS indicating to which users the various connectionless (FIG. 6) servers are dedicated, e.g. CLS1 is dedicated to CLTE5 and CLTE1, the type of path connection, i.e. permanent (P) or temporary (NP), via which these users are connected to the server and the bandwidth BU1/5 reserved on these path connections:

that part of the connectionless routing table CRO (FIG. 6) containing the addresses of the connectionless servers of the switching system, the links over which they may be reached by the network management centre NMC and the bandwidth to be reserved on path connections to these servers e.g. CLS1, LNN1, BS1 which means that NMC can reach CLS1 over link LNN1 and that the bandwidth to be reserved on this link is BS1.

Reference is now made to FIG. 11 for the description of the creation of a virtual overlay network of permanent virtual path connections. This description concentrates on the interworking, first between NMC and CLS1 over NN1 and afterwards between CLS1 and its users CLTE1 and CLTE5 as well as between CLS1 and the other servers. Interworking between NMC and the other connectionless servers, between these servers and their users and between the servers happens in a similar way. To start creation of a virtual overlay network, a hardware operator command C/O of the setup request by operator type (SURO) is given by the operator OP to the NMC via the link OPL. When receiving this command via REN the cell handler CHN of the NMC determines the command type (CT), and because it is SURO it reads in IMN (RIMN) the tables CRO (FIG. 6) to find the address of the connectionless server CLS1 and the links LNN1 thereto and sets up a permanent virtual path connection to these servers (SUCC) via this link. For instance, the cell handler CHN builds up a path setup control cell, as represented in FIG. 10(d), and passes it to the cell sending equipment SEN (FIG. 5) which transmits it on the link LNN1 leading to switching node NN1 (FIG. 2) and more particularly to the receive port RX4 of switching element E113 (FIG. 4). This setup control cell has following fields:

VPI: is storing the successive identifiers of the virtual paths constituting a virtual path connection.

T: the type of cell, e.g. a point-to-point path set up control cell;

RT: a routing tag containing five sets of 4 bits. Each set defines a respective one of the 16 terminals or links of a switching element and the sets are associated to respective switching elements of the five stages of the nodes via which a connection may be stablished;

SC: a selection code indicating for each of the terminals defined by RT if the selection thereof has to be performed freely (FS) or is fixed (F);

RP: the identity of a return path in the network;

LP: traffic load parameters characterizing the bandwidth to be reserved on the path;

CRC: a check code which is function of the contents of the information field IF and used to check the latter.

The fields of a setup control cell sent out by NMC to setup a virtual path connection to CLS1 more particularly have following values:

| VPI | VPI1 (value chosen by NMC) | | | | |
|---|---|---|---|---|---|
| R | path setup control packet | | | | |
| RT | X | X | 8 | 2 | 3 |
| SC | FC | FC | F | F | F |
| RP | X | X | X | X | X |
| LP | BS1 | | | | |

When the latter setup control cell is received on the input terminal R4 (FIG. 4) of the receive port RX4 of the switching element E113 (FIG. 3) it is entered in the receive buffer RBUF4 thereof under the control of the processor RPR4 which then reads the cell and performs the following operations:

it writes the address 4 of the input terminal on which the cell is received and of which the corresponding output link has to be used by a return or backward cell, in the first position of the return path field RP of the cell, so that this field becomes:

RP: 4, X, X, X, X and then supplies this cell from RBUF4 to the cell multiplexer PMUX4;

via its address output A it applies the address 9 of the output terminal or output link T9 of the transmit port TX9 to the address multiplexer AMUX41.

The processor RPR4 then controls the interface circuit IC4 in such a way that the latter operates the multiplexers PMUX4 and AMUX4. As a consequence, from these multiplexers the path setup cell is supplied via the output P to the input 4 (not shown) of the bus TB and the address is communicated via the output A to the control unit TM of this bus TB. As a result the control unit TM connects the input 4 of TB to the transmit port TX9 and transmits the cell thereto. The latter port then routes the cell to the switching element control circuit SEC113 via its output T9.

Upon the receipt of the path setup control cell in the control circuit SEC113 the processor PR113 thereof performs the functions described here after.

This processor PR113 selects an output terminal or output link of the switching element E113, e.g. T8 or 8, on which the path setup cell, and later the data cells of the cell stream following it, have to be transmitted to the second stage or node of the switching network.

In the way described in the above European patent application the processor PR113 calculates the new total bandwidth on this link by means of the previously calculated total bandwidth value B1(8) or load counter value stored in table T1 of the MEM113 and the traffic load parameters LP contained in the cell. It then checks if the newly calculated bandwidth or new load counter value is smaller or larger than the maximum allowable bandwidth B(8) on this link also stored in table T1 of the MEM113 and accordingly allows the control cell to be multiplexed on the selected output link 8 or refuses to do so. In the latter case the processor selects another output link and performs similar calculations, etc. In this way either a suitable output link, i.e. a suitable virtual communication path thereon, is found or not. In the latter case the switching element E113 is considered to constitute a blocked end for the communication under consideration and a blocked control cell is sent back by the switching element over the return path RP recorded in the setup cell. In the following it is supposed that E113 is not a blocked end and that output link 8 may be used.

Under this assumption the processor PR113 selects in MEM113 an output path identifier VPII1 to indicate the selected virtual communication path on output link 8 and via the bus SB and the interface circuit IC4 updates the routing tables RT4 which will be used for routing cells over the established path.

Finally, the processor PR113 also modifies the contents of the path setup cell by writing 8 and VPII1 in the first positions of the fields RT and in the field VPI respectively, by changing FS in the first position of SC by F and by then subjecting RT and SC to a circular shift in anti-clockwise direction. Thus the fields of the cell become:
VPI: VPII1.
RT: X, 8, 2, 3, 8
SC: FS, F, F, F, F
RP: 4, X, X, X, X The thus modified cell and the address 8 are then transmitted via the bus SB to one of the receive ports RX1/8, e.g. to RX4 and more particularly to the interface circuit IC4 which supplies the cell to the cell multiplexer PMUX4 and applies the address 8 to the address multiplexer AMUX4 via its outputs P and A respectively. Under the control of IC4 the cell is then transmitted from these multiplexers and via the bus TB to the transmit port TX8. By this transmit port TX8 it is afterwards transmitted on the output link 8 of E113 to the input terminal 3 of the switching element E214 where operations similar to those described above are executed. When the setup control cell thus reaches CLS1 the VPI field contains the identity of the last established part of the connection i.e. VPIN on LNC, which has to be used by CLS1 when sending a confirm control cell to the NMC to acknowledge the setup of the connection, the RT field contains the value 85823 which is the route followed by the setup control cell and RP contains the value 85134 which is the path to be followed by the confirm control cell.

It has to be noted that the above description of a path setup with respect to E113 is applicable to any switch element of the network NN1.

The arrival of the setup control cell in CLS1 station is confirmed by an above mentioned confirm control cell (FIG. 10(e)) which contains among others a VPI field containing the VPI of the path on which the cell is transmitted, a type field T indicating that the cell is a confirm control cell, a routing tag RT equal to the return path field RP of the setup cell and a return path field RP equal to the routing tag RT of the setup cell.

Since communication in an ATM network is unidirectional, CLS1 has in a similar way to establish a virtual path connection to the NMC, the address of which can be deducted from the RP field of the setup cell sent by the NMC to CLS1.

In the same way as described above for CLS1 the network management circuit NMC controls the establishment of virtual path connections to the other connectionless servers. Upon receipt of the confirm control cells from these servers the network management circuit NMC completes the tables CRO (FIG. 6) by adding for each server CLS1/CLS3 the identity VPI1/VPI3 of the path via which that server may be reached by NMC.

In a next step the network management circuit NMC, via its cell handler CHN and sending equipment SEN (FIG. 5), issues a path setup message (FIG. 10(a)) to each connectionless server (setup out-SUO) e.g. CLS1, over the previously established permanent path to request for the setup of virtual path connections to its users and to the destination servers able to be accessed from CLS1, e.g. NMC requests CLS1 to set up a virtual path connection to CLTE1. This message represented in FIG. 10(a) contains the VPI of the path over which it is being sent, i.e. from NMC to CLS1, a message code MC indicating that the message is a path setup message, the destination address DEST, e.g. CLTE1, space reserved for the VPI of the path connection to be established, the bandwidth B, e.g. BU to be reserved on the permanent virtual path connection and the path type PT of the path to be established e.g. P being permanent.

It has to be noted that a user can have access to its server via either a permanent (P) or a temporary (NP) virtual path connection depending on the traffic load on these access paths. In case of low load, a temporary path is established the moment transmission is requested.

Reference is now made to FIGS. 12 and 13 to describe how this path setup message is handled by CLS1.

When receiving this setup message (setup in-SUI) the cell handler CHC (FIG. 7) of CLS1 by interpreting the MC field of the message detects that the latter is a setup message, stores the address of CLTE1, i.e. CLTE1, the bandwidth to be reserved BU1 and the type of connection P in the table CIC2 and issues via its sending equipment SEC (FIG. 7) a setup control cell and transmits it to the network node NN1 it is connected with (SUC). Path setup through one network node was described earlier. Following is the description of a virtual path connection setup from CLS1 to CLTE1 through the switching system. The routing tag RT in the setup control cell issued by CLS1 is a concatenation of the routing tags to be used in each network node involved in the setup of the initial path connection and is related to the address of CLTE1. Each network node receiving the setup control cell i.e. NN1 and NN4, considers as routing tag the first part of the routing tag contained in the cell and after having handled the cell shifts that part to the end of the routing tag. In this way virtual paths constituting the virtual path connection from CLS1 to CLTE1 are setup by NN1 and NN4, i.e. CLS1-NN1, NN1-NN4; NN4-CLTE1. Upon receipt of the setup cell CLTE1 sends a confirmation cell (FIG. 10(e)) to CLS1 so that the first and second connection information tables CIC1/CIC2 (FIG. 8) can be completed by the CHC (FIG. 7) of CLS1 (UIMC) with the VPI retrieved from that confirmation cell. CIC1 is involved in the virtual path connection setup between CLS1 and the other connectionless servers, while CIC2 relates to the path connection setup between CLS1 and its users. In a next step a setup acknowledgment message (FIG. 10(c)) containing this information is sent by CLS1 to the network management circuit NMC (ACK) which accordingly (FIG. 11, UIM when CT=NOTIF), by means of its cell handler CHN (FIG. 5) completes its connection information table CIN (FIG. 6) with the VPI's corresponding with the created virtual path connections. Virtual path connections between CLS1 and the other connectionless servers are established in the same way except that the path connections are always permanent.

It has to be noted that the network management circuit NMC can send multiple setup requests for the same destination connectionless server using other destination addresses, in which case alternative virtual path connections are established, e.g. from CLS1 to CLS3, 3 alternative path connections are set up.

In the way described above the following permanent virtual path connections, constituting the virtual overlay network, are thus established:
a connection from MAN2 to CLS2 and vice versa over NN4 and NN2;
a connection from MAN1 to CLS2 and vice versa over NN2;
CLS1 and CLS2 are connected via NN1 and NN2 and vice versa;
CLTE1 is connected to CLS1 over NN4 and NN1 and vice versa;
CLTE5 is connected to CLS1 via NN1 and vice versa;
a connection from CLS1 to CLS3 over NN1, NN2 and NN3;
an alternative connection from CLS1 to CLS3 and vice versa over NN1 and NN3;
another alternative connection from CLS1 to CLS3 over NN1, NN4, NN2 and NN3;
CLS3 is connected to CLS2 over NN3 and NN2 and vice versa;
and NMC is connected to CLS1, CLS2 and CLS3 via NN1, NN2 and NN3 respectively and vice versa.

As already mentioned these paths are called permanent because they are not released after use for a communication. On the contrary, CLTE3 which is a sporadic user of the telecommunication switching system is connected to NN3 via a temporary virtual path and the latter will be established each time cells have to be transmitted or received and will be released after the transmission.

As described above the permanently established virtual path connections have an estimated bandwidth, e.g. B1. However, this bandwidth may be zero. Such connections are called sleeping connections and are used when the bandwidth available for a permanent virtual path connection to a given destination has to be increased while there is not enough space bandwidth available on that virtual path connection.

Once a permanent virtual connection is established and used for communication as indicated in routing tables (not shown), the bandwidth measurement circuit MC1 of CLS1 (FIG. 9) starts measuring on a periodic basis, the mean used bandwidth on these connections as described hereafter for the connection between CLS1 and CLS31 which is identified by VPI4. A copy of a cell passing through RSE is passed to the cell handler CH (FIG. 9). The latter analyses the received cell to obtain the identity of the path on which the cell is received, i.e. VPI4, and accesses the connection cell info tables CCI (FIG. 8) to retrieve information, earlier stored by CH, concerning the number of cells already received on this path, i.e. x1 and concerning the time on which the cell count was started i.e. t1. This information is passed to the information handler IH which calculates the time elapsed since cell count start until the current time given by the clock circuit C and compares it with a predetermined time interval value. It increments the cell count with one if the elapsed time is less than the given time interval or resets the cell count and calculates the mean bandwidth by dividing the number of cells by the elapsed time when the elapsed time is equal or greater than the predetermined time interval. The results of these calculations, i.e. the cell count and mean bandwidth, are returned to the cell handler CH which accordingly updates the tables BMI with the mean bandwidth B11 and CCI, with the new cell count or with x1=0 and a new start time in case of reset (FIG. 8) (MB—FIG. 12).

It has to be noted that the bandwidth measurement circuit described above differs slightly from the circuit considered in the mentioned French patent application in that the cells pass through the present circuit without change, whereas in the French patent cells are marked or deleted when the number of cells already received or the mean bandwidth exceeds a given maximum value.

The thus measured bandwidth B11 is compared with the reserved estimated bandwidth B1 contained in CIC1 of IMC (FIG. 8). In case the former exceeds the latter, e.g. when on the first virtual path connection from CLS1 to CLS3 B11 exceeds B1 by a value D (TE=Y), the reserved estimated bandwidth is adapted. FIG. 13 shows how this adaptation is done. In a first instance (AB) CLS1 tries to setup on the same link a virtual path connection with a reserved bandwidth D equal to the additional required one to the same destination address as the virtual path connection on which the bandwidth has to be adapted and parallel to this connection, i.e. CLS1 issues a path setup cell of which the routing tag RT completely defines the ports used in the virtual path connection between CLS1 and CLS3. During this setup the reserved bandwidth value recorded for each output port involved in the setup, e.g. B1(8) for the output port 8 of receive port 4, is increased by D. When this path setup succeeds the parallel connection is released by means of a release cell with a bandwidth equal to zero. This means that the recorded bandwidth values e.g. B1(8) are unchanged and still include the value D. Thus the bandwidth D is made available for the virtual path connection on which the bandwidth has to be adapted. How a virtual path connection is released will be explained later. After successful (OK=Y) adaptation of the bandwidth (AB) the bandwidth values in the table CIC1 (FIG. 8) are replaced by the new bandwidth i.e. for CLS1, CLS31, B1 is replaced by B1+D and a notification message (FIG. 10 (b)) with the VPI of the virtual path connection and the increased bandwidth is sent to the network management circuit (VIO) which updates its connection information table CIN (FIG. 6) accordingly, i.e. for CLS1-CLS31 B1 is replaced by B1+D.

When no parallel connection can be setup (OK=N), because one of the switching elements involved in the path connection setup does not have enough bandwidth available on its output ports and therefore is a blocking end, a new alternative virtual path connection has to be taken (NV and NRA=NW) to the same destination connectionless server. In case of an existing sleeping connection (SL=Y) to that destination bandwidth is allocated (BA) for that sleeping connection in the same way as described above i.e. by means of a parallel connection and CIC1 and CIN are adapted as explained earlier. When the bandwidth can not be adapted neither via a parallel connection nor via a sleeping connection, a new alternative virtual path has to be setup to the destination connectionless server. In order to obtain the information necessary to do so, CLS1 sends a connect request message (FIG. 10(g)) to the NMC (CV). Such a message includes the destination address of the destination connectionless server and the additional required bandwidth.

Upon receipt of such a request (FIG. 11—CT=SURC), the cell handler CHN (FIG. 5) of the network management circuit NMC computes from its network information table NI the destination address for an alternative path to CLS1 (FIG. 11—RIMN) and sends out (FIG. 11—SUO) a setup request to CLS1 (FIG. 10(c)). Handling of such a request by CLS1 has been explained earlier.

In a similar way the resource manager module RSM (FIG. 7) of CLS1, may detect that part B or all of the reserved bandwidth on a permanent virtual path connection, e.g. on the second virtual path connection from CSL1 to CLS3 has become redundant. In the latter case that permanent virtual path connection is released (FIG. 13—RVP), whereas in the former case a parallel virtual path connection with zero bandwidth is setup as explained earlier and released afterwards (FIG. 13—AB) by means of a release cell with bandwidth equal to the redundant bandwidth B. In both cases the information memory of CLS1 IMC (FIG. 8) is updated by its cell handler CHC, e.g. in case of redundancy, the tuple CLS1-CLS32, VPI5, B1, is deleted from table CIC1; in table CCI the tuple VPI5, t2, x2 is deleted and VPI6, B21 is removed from BMI. A reduced bandwidth message (FIG. 10(f)) is then sent to the network management centre to accordingly update its information memory IMN (FIG. 6), i.e. CLS1-CLS32, VPI5, B1 is deleted from table CIN; in case of reduced bandwidth CIC1 is updated by replacing B1 for CLS1-CLS32 by B1-B and in CIN of IMN (FIG. 6) B1, for CLS1-CLS32 is replaced by B1-B.

The following is a more detailed description of a virtual path connection release e.g. release of the virtual path connection with VPI equal to VPI6.

To release a virtual path connection, the cell handler CHC (FIG. 7) of the involved connectionless server e.g. CLS1, issues a release control cell (FIG. 10(f)) including among others the type T of the control cell, i.e. a release cell, the identity VPI of the path to be released e.g. VPI6, and the released bandwidth LP, e.g. B2. This cell is transmitted through the switching network. When the cell is received on an input terminal e.g. R4 of receive port RX4 of the switching element E113 (FIG. 4), the earlier mentioned processor RPR4 recognizes the cell as being a release cell, deletes the related routing information from its routing table RT4 and decreases the value of the related load counter stored in T1. This is done in all switch elements of all network nodes forming part of the cleared path connection.

While the principles of the invention have been described above in connection with specific apparatus, it is to be clearly understood that this description is made only by way of example and not as a limitation on the scope of the invention.

I claim:

1. Communication switching system with a plurality of terminal units (CLS1/CLS3), coupled via switched communication links, and control means (CC11/CC14) to establish between at least a pair of said terminal units and over said links at least one permanent virtual connection with a reserved estimated bandwidth, characterized in that said system further includes:
   counter means (CO1/CO4) to register said reserved estimated bandwidth;
   measurement means to measure the bandwidth used on said permanent virtual connection;
   second control means (CC21-CC23) which cooperate with said first mentioned control means (CC11/CC14) to compare said reserved estimated and used bandwidths and which according to the result of this comparison adapt said reserved estimated bandwidth for communication between said terminal units.

2. Communication switching system according to claim 1, characterized in that said reserved estimated bandwidth for communication between said terminal units (CLS1/CLS3) is adapted by modifying said reserved estimated bandwidth on said one permanent virtual connection between these units.

3. Communication switching system according to claim 2, characterized in that to modify said reserved estimated bandwidth on said one permanent virtual connection between said terminal units (CLS1/CLS3), said first mentioned control means (CC11/CC14) establish a second virtual connection which is parallel to said first mentioned permanent virtual connection, uses the same links and has a predetermined first bandwidth, said counter means (CO1/CO4) then add said predetermined first bandwidth to the reserved estimated bandwidth of said first connection so as to obtain a sum bandwidth, whereafter said first mentioned control means release said second virtual connection with a predetermined second bandwidth and said counter means decrease said sum bandwidth by said predetermined second bandwidth.

4. Communication switching system according to claim 3, characterized in that said first mentioned control means (CC11/CC14) also establish between said pair of terminal units (CLS1/CLS3) a third permanent virtual connection and that said bandwidth adaptation is performed by reserving a predetermined third bandwidth for communication on said third permanent virtual connection.

5. Communication switching system according to claim 3, characterized in that the bandwidth of said second permanent virtual connection is initially equal to zero.

6. Communication switching system according to claim 1, characterized in that it includes a switching network (NET) with first communication links and to which said terminal units (CLS1/CLS3) as well as user circuits are coupled via second communication links, each of said terminal circuits being constituted by a server circuit which is dedicated to at least one of said user circuits and vice versa.

7. Communication switching system according to claim 6, characterized in that said switching network (NET) comprises a plurality of intercoupled switching nodes (NN1/NN4), that said counter means (CO1/CO4) and said first mentioned control means (CC11/CC14) are distributed over said switching nodes, whilst said measurement means (MC1/MC3) and said second control means (CC21/CC23) are distributed over said server circuits.

8. Communication switching system according to claim 1, characterized in that said control means are also able to establish temporary virtual connections in said network.

* * * * *